(12) United States Patent
Givargizov et al.

(10) Patent No.: US 7,843,122 B2
(45) Date of Patent: Nov. 30, 2010

(54) COLUMNAR STRUCTURE, METHOD OF ITS PRODUCTION AND DEVICES BASED THEREON

(76) Inventors: Mikhail Evgenjevich Givargizov, Academika Vargi, 1-115, Moscow 117133 (RU); Evgeniy Invievich Givargizov, Obrucheva, 20-12, Moscow 119421 (RU)

(*) Notice: Subject to any disclaimer, the term of this patent is extended or adjusted under 35 U.S.C. 154(b) by 922 days.

(21) Appl. No.: 11/688,763

(22) Filed: Mar. 20, 2007

(65) Prior Publication Data

US 2007/0221868 A1    Sep. 27, 2007

Related U.S. Application Data

(63) Continuation of application No. PCT/RU2005/000475, filed on Sep. 20, 2005.

(30) Foreign Application Priority Data

Sep. 20, 2004   (RU)   ................... 2004127851
Sep. 29, 2004   (RU)   ................... 2004128734

(51) Int. Cl.
*H05B 33/00*    (2006.01)
*G01J 1/58*    (2006.01)
(52) U.S. Cl. .................. 313/498; 250/487.1
(58) Field of Classification Search .......... 313/498–512
See application file for complete search history.

(56) References Cited

U.S. PATENT DOCUMENTS

2007/0184180 A1*  8/2007  Givargizov et al. ........... 427/64

* cited by examiner

*Primary Examiner*—Joseph L Williams
(74) *Attorney, Agent, or Firm*—Knobbe Martens Olson & Bear LLP

(57) ABSTRACT

Described herein is a columnar structure on a transparent substrate that incorporates emitting, light-guiding, dielectric, and conduction elements. At least one emitting element of the columnar structure is a column that conducts and/or emits a particle flux, with the surface of one butt-end of the column facing the inside of the substrate and contacting it immediately or indirectly, and the surface of the other butt-end enabling the passage of emission exciting particles into the column.

14 Claims, 11 Drawing Sheets

COLUMNAR STRUCTURE, METHOD OF ITS PRODUCTION AND DEVICES BASED THEREON

CROSS-REFERENCE TO RELATED APPLICATIONS

This application is a continuation of PCT/RU2005/00475, entitled "Columnar Structure, Method for the Production Thereof and Devices Based Thereon," filed on Sep. 20, 2005, which claims foreign priority to Russian Application No. 2004127851, filed on Sep. 20, 2004 and Russian Application No. 2004128734, filed on Sep. 29, 2004, its contents of which are hereby incorporated by reference in its entirety.

BACKGROUND OF THE INVENTION

1. Field of the Invention

The present invention relates to the domain of lighting engineering, the element base of microelectronics, electronic and electromagnetic materials science, including vacuum microelectronics, X-ray optics, luminescence, including cathodoluminescence, photoluminescence and electroluminescence, specifically, to the luminescent screen technology used in field emission displays, cathode-ray tubes, light sources, X-ray electronic-optical transducers as well as optical dosimeters, etc.

2. Description of the Related Technology

The problem of luminescence realization and effective solid-state light source creation has been dealt with for 60 years already. In the classical case these purposes are accomplished with the use of phosphor powders. At the present time however there are several device designs proposed for these purposes that significantly outperform the above-mentioned classical solutions. See RF Patent No. 2144236, entitled "Cathodoluminescence Screen," dated Jan. 10, 2000; RF Patent No. 2127465, entitled, "Method for Fabrication of Columnar-Structure Luminescence Screens," dated Mar. 10, 1999; RF Patent No. 2214073, entitled "White Light Source," dated Oct. 10, 2003; and WO 99/22394, entitled "Cathodoluminescent Screen with a Columnar Structure, and the Method for its Preparation," dated May 6, 1999, all of which are hereby incorporated by reference in their entirety. This is achieved by creating light-guiding structures from the material of the phosphor itself. Nevertheless they cannot be considered as fully refined designs.

In the proposed embodiments of the prior art, the lateral surface may be included into the process of phosphor material activation for emission generation. FIGS. 1a and 1b represent columnar structures in cross-section from the prior. The numerals represent as follows: 1—transparent substrate, 2—columns of material converting energy of particles entering thereinto into electromagnetic radiation quanta, 3—flux of particles falling onto columnar structure, 4—lateral surface of columns, 5a, b—flux of quanta generated in column material as well as particles entering thereinto, 6—intercolumnar space, 7—material impermeable to particles propagating in column material. In FIG. 1a, the intercolumnar space 6 is unfilled, where is FIG. 1b, the intermediate space filled. FIGS. 1a and 1b schematically represent a process of penetration of falling particle flux into columnar structure material, propagation and reflection of emission generated thereby.

While the prior art enhances the phosphor efficiency, i.e. a portion of excitatory particles entering at an angle into the clearance between columns 6 also takes part in the phosphor activation, there are many drawbacks. For example, it is impossible to use in full measure the advantage of the light-guiding columnar screen concept that essentially consists in the total internal reflection of generated emission. Such a structure operates practically as a conventional phosphor. The particle flux 3 falling onto the lateral surface 4 and propagating 5a (and generating emission in the phosphor material) in the material of such phosphor, penetrates 5b the column boundaries in a transverse direction and undergoes multiple refraction at the adjacent column boundary. If, as is proposed by the prior art, the space between the material grains is filled with a reflecting material 7 (see FIG. 1b), the particle flux 3 falling at angle α into the intercolumnar clearance will not participate in the processes of emission activation in the phosphor material.

SUMMARY OF CERTAIN INVENTIVE ASPECTS

The present invention puts forward a flexible phosphor structure embodiment and a method for its production, that make it possible to realize the advantages of the columnar structure, specifically, total internal reflection, with the involvement of at least a part of the lateral surface of each column in the process of generation of required emission. Thereby the present invention proposes an enhanced-efficiency columnar structure design with the light-guiding properties retained. The proposed design is much simpler to fabricate that reduces its production cost price.

The present invention proposes a columnar structure on a transparent substrate that incorporates emitting, light-guiding, dielectric and conduction elements. At least one emitting element of the columnar structure is a column that conducts and/or emits a particle flux, with the surface of one butt-end of the column facing the inside of the substrate and contacting it immediately or indirectly, and the surface of the other butt-end enabling the passage of emission exciting particles into the column. A part of the lateral surface can be coated with a material that reflects the flux of particles propagating in the column material, and the particles can also penetrate a part of the lateral surface of the column. The above-mentioned column can represent a single-crystalline structure. The surface of the column butt-end enabling the passage of particles into the column can be coated with a light-reflecting conducting material. The same coating can be also deposited on the outside and inside of the substrate. Used as a column material can be a phosphor in which the density of at least one activator can be distributed in a specified manner along the column axis. And used as a material for at least a part of the column can be at least one more phosphor of some other composition. The column can be also completely coated with a material that reflects the flux of particles propagating in the column material. The material that covers a part of the lateral surface and reflects the flux of particles propagating in the column material can be a material used for filling a part of the space between the columns. In this case the remainder of the lateral surface and the butt-end of the column through which the flux of emission exciting particles penetrates thereinto can be coated with a thin layer of a light-reflecting material. In any of the above-listed cases both an inorganic compound and an organic compound can be used as a column material.

The present invention proposes a method for fabrication of a columnar structure of the emitting substance on a substrate that comprises the deposition on the substrate of an intermediate substance differing in composition from the emitting substance, that forms a liquid phase as isolated of fragmentary-isolated particles at crystallization temperature of isolated particles, and the deposition of the emitting substance material which process may be accomplished with specified spatial distribution. In so doing it is possible to deposit on the substrate at least one more emitting substance, and to deposit on the substrate at least one more intermediate substance. Prior to depositing on the substrate the intermediate substance that later forms the liquid phase, it is possible to deposit on the substrate surface a substance that enhances the adhesion of the intermediate substance to the substrate material. Upon deposition of the substance that enhances the adhesion of the intermediate substance to the substrate material, it is possible to deposit on the substrate one more substance that promotes shaping an intermediate substance drop to a near-sphere form and fixing the drop on a specified area of the substrate during the passage of the intermediate substance into the liquid phase.

Proposed in accordance with the present invention is a light source that comprises a source of particles capable of generating electromagnetic emission quanta in the solid, a material in which electromagnetic emission quanta are generated, the said material having a columnar structure as per the above-described design.

The present invention also proposes a design of an X-ray electronic-optical transducer containing a material in which electromagnetic emission quanta are generated during X-ray absorption, the said material having a columnar structure as per the above-described design.

An optical dosimeter that can be realized as per the present invention contains a material in which electromagnetic emission quanta are generated during emission absorption, the said material having a columnar structure as per the above-described design.

The present invention also proposes a method for fabrication of a columnar structure of the emitting substance on a substrate that comprises the deposition on the substrate of an intermediate substance differing in composition from the emitting substance, that forms a liquid phase as isolated of fragmentary-isolated particles at crystallization temperature of isolated particles, and the deposition of the emitting material substance from the vapor phase. During the process, prior to depositing on the substrate the intermediate substance that later forms the liquid phase, a substance that enhances the adhesion of the intermediate substance to the substrate material is deposited on the substrate surface. In addition to that, upon deposition of the substance that enhances the adhesion of the intermediate substance to the substrate material, it is proposed to deposit on the substrate one more substance that promotes shaping an intermediate substance drop to a near-sphere form and fixing the drop on a specified area of the substrate during the passage of the intermediate substance into the liquid phase.

DETAILED DESCRIPTION OF CERTAIN EMBODIMENTS

Figure 1A:
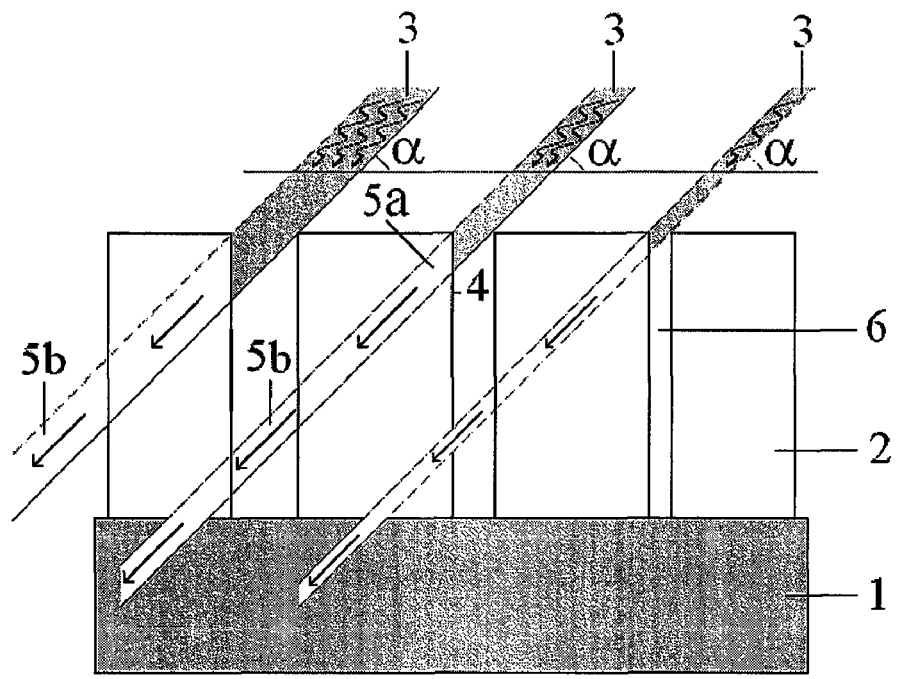
FIGS. 1a-b each show a cross-section of a columnar structure of the prior art.
Figure 1B:
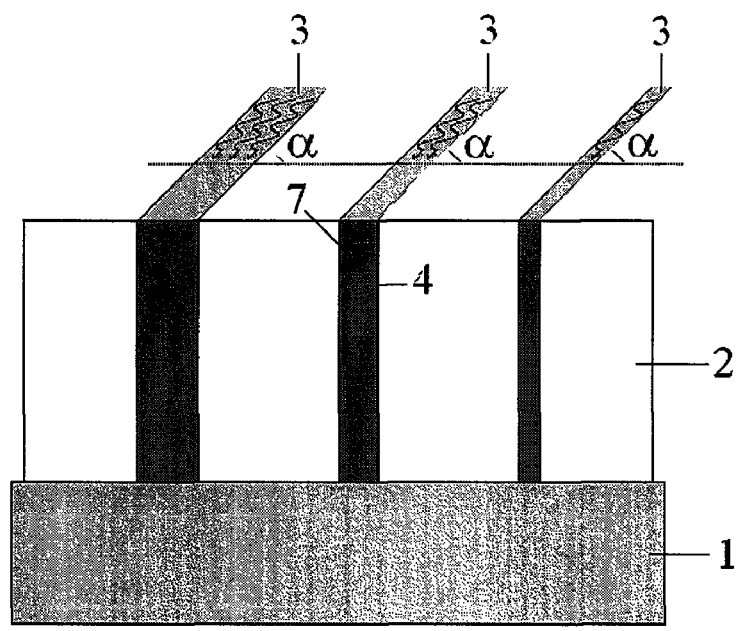
Figure 2A:
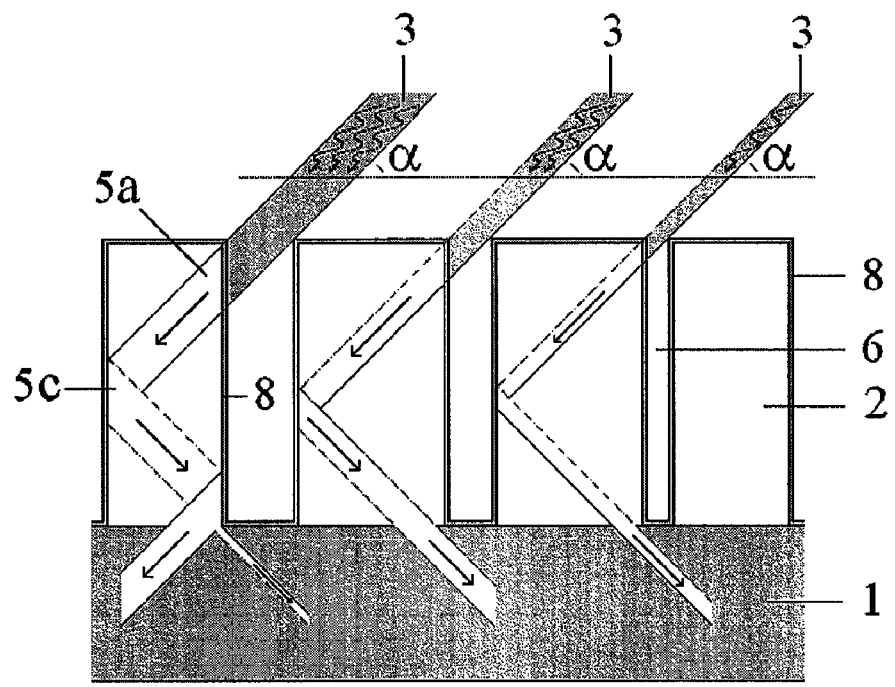
FIGS. 2a-b each show a cross-section of an embodiment of a columnar structure described herein.

The Figures and their corresponding numerals will now be described. FIG. 2a—Columnar structure in cross-section for emission generation by particles capable of penetrating additional coat on columnar structure surface. 2b—Columnar structure in cross-section with partially coated lateral surface for emission generation by particles capable of penetrating uncoated surface only. Schematically represented process of penetration of falling particle flux into columnar structure material, propagation and reflection of emission generated thereby. 1—transparent substrate, 2—columns of emission material converting energy of particles entering thereinto into electromagnetic radiation quanta, 3 and 3a—flux of particles falling onto columnar structure, 4—lateral surface of columns, 5a, c—flux of quanta generated in column material as well as particles entering thereinto, 6—intercolumnar space, 8—lateral surface coating opaque to quanta generated in column material, 9—outer column butt-end, 10—inner column butt-end facing substrate.

Figure 3A:
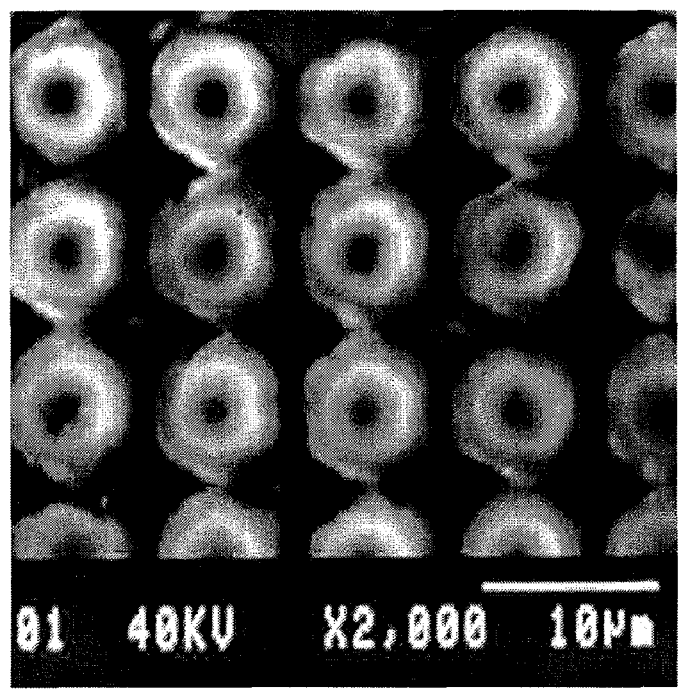
FIGS. 3a-b each show an optical emission photograph of an embodiment of columnar structure described herein.
Figure 3B:
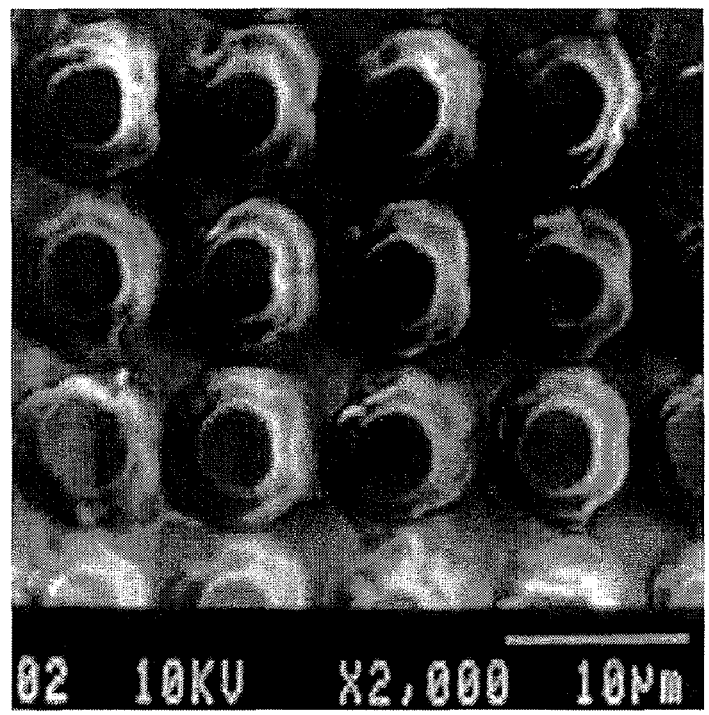
Figure 4A:
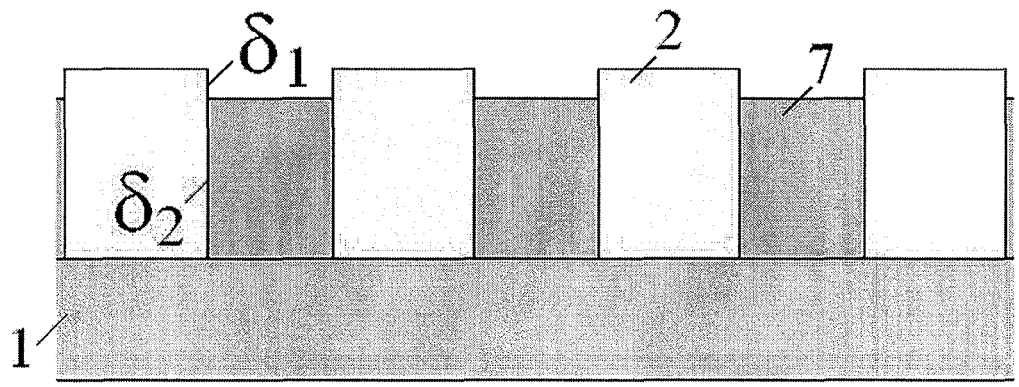
FIGS. 4a-i each show a cross-section of an embodiment of a columnar structure described herein.
Figure 4B:
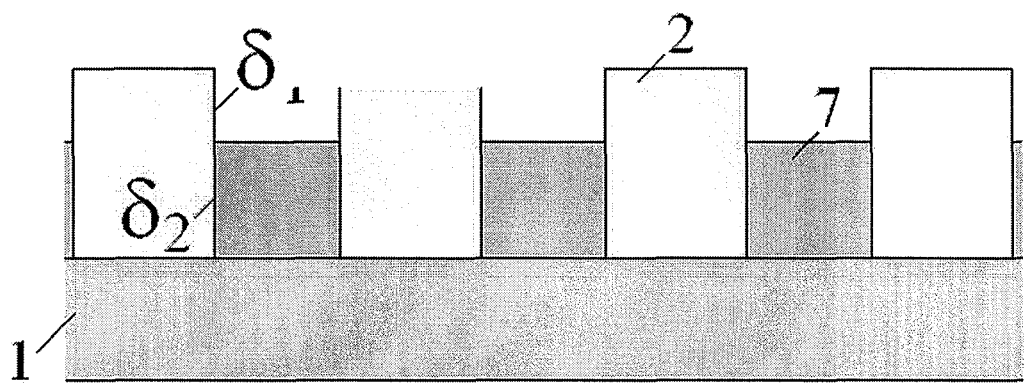
Figure 4C:
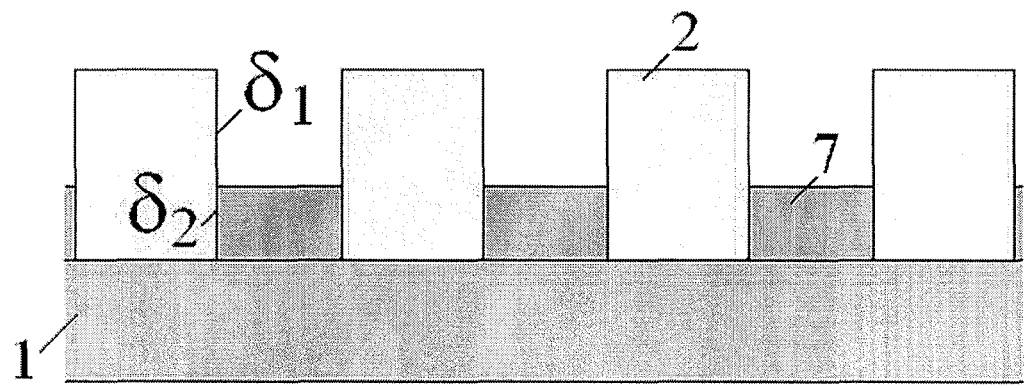
Figure 4D:
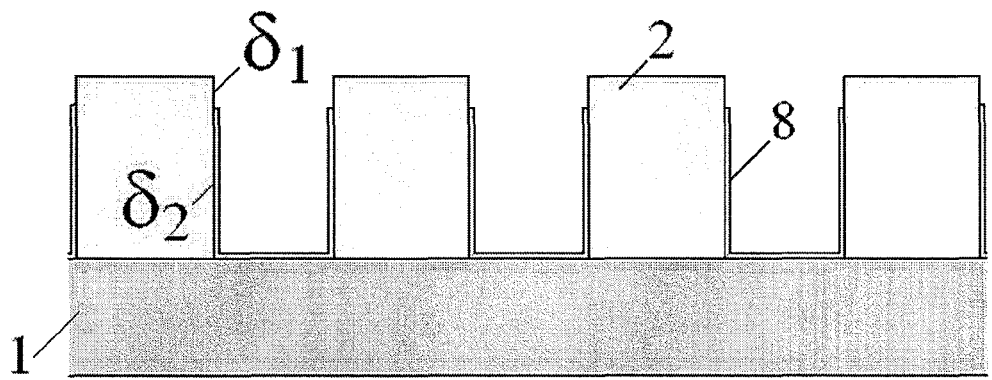
Figure 4E:
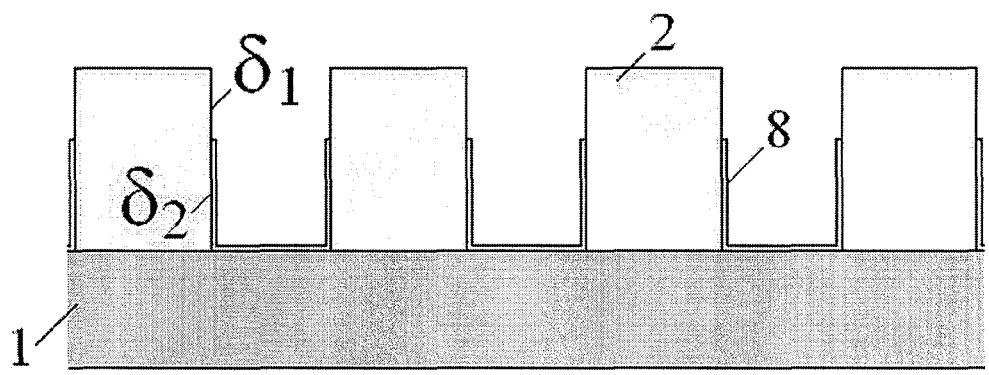
Figure 4F:
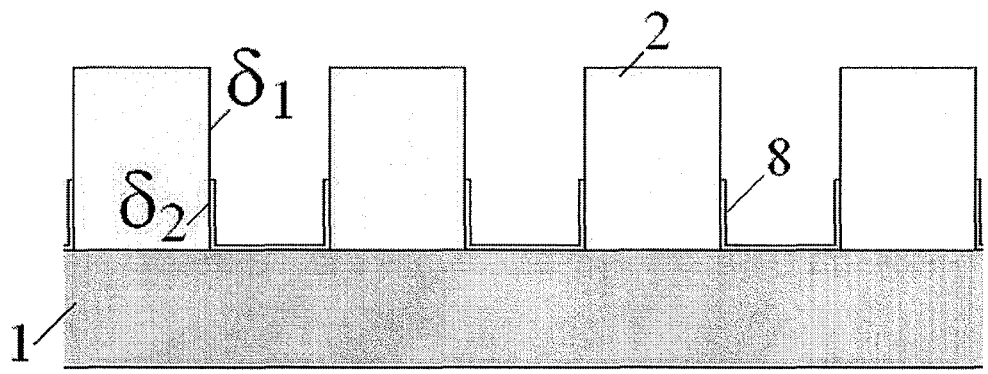
Figure 4G:
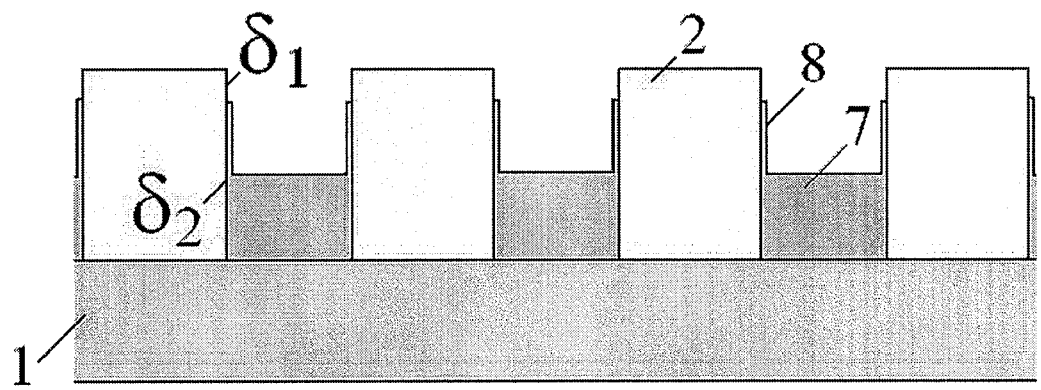
Figure 4H:
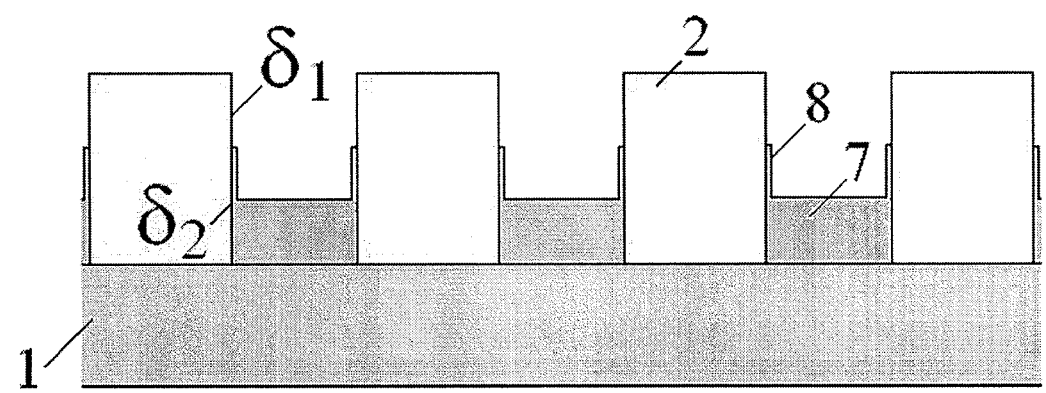
Figure 4I:
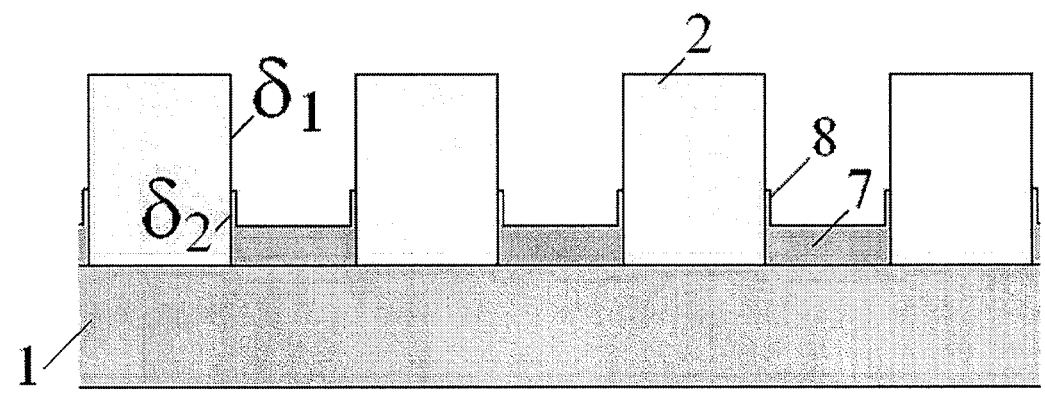

FIG. 3a—Regular columnar structure optical emission microphotograph taken as per present invention. The photograph was obtained during electron-flux exposure of column material. FIG. 3b—Regular columnar structure morphology microphotograph taken as per present invention.

FIG. 4a-i—An embodiment of a columnar structure in cross-section. 1—transparent substrate, 2—columns of material converting energy of particles entering thereinto into electromagnetic emission quanta, 7—material impermeable to particles propagating in column material, 8—lateral surface coating opaque to quanta generated in column material, $\delta_1$—part of column lateral surface free from opaque material, $\delta_2$—part of column lateral surface coated with opaque material.

Figure 5A:
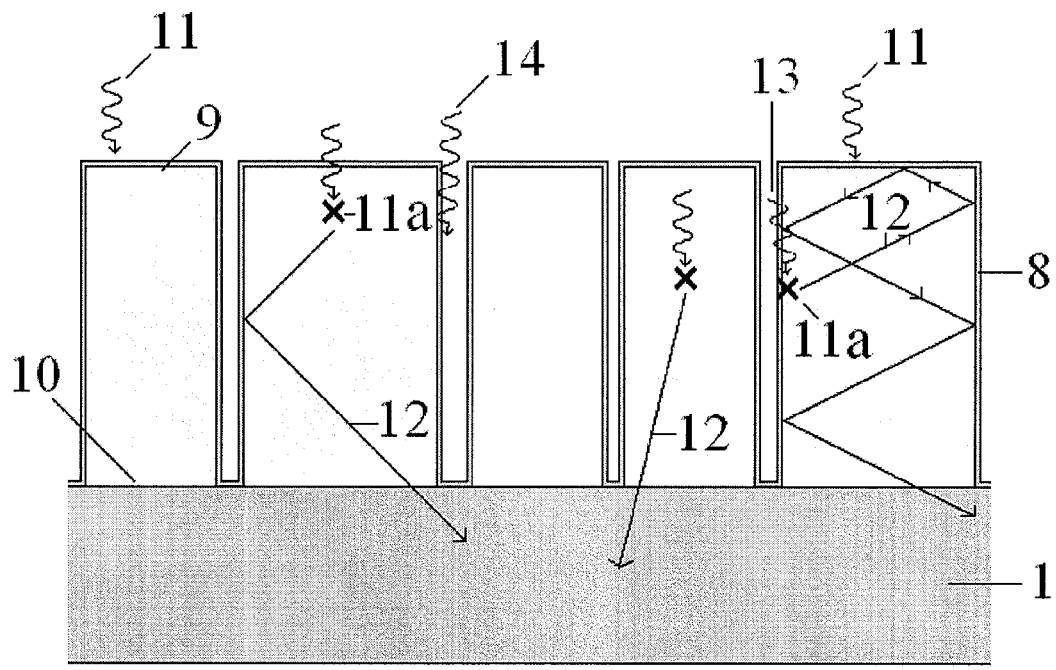
FIGS. 5a-c show an embodiment of a process of penetration of falling particle flux into a columnar structure material.

FIGS. 5a, b, and c—Schematically represented process of penetration of falling particle (e.g., electron) flux into columnar structure material, propagation and reflection of emission generated thereby. 1—transparent substrate, 8—lateral surface coating opaque to quanta generated in column material, 9—outer column butt-end, 10—inner column butt-end facing substrate, 11—flux of particles falling onto columnar structure, 11a—emission generation in column material by falling particle flux, 12—direction of propagation of emission generated in column material, 13—emission exciting particle penetrating column material through lateral surface and generating emission, 14—emission exciting particle penetrating column material through lateral surface and not generating emission, 15—substrate inner surface coating reflecting emission generated in column material, 16—substrate outer surface coating reflecting emission generated in column material, 17—direction of propagation of emission generated in column material in reflection-mode luminescence device.

Figure 6:
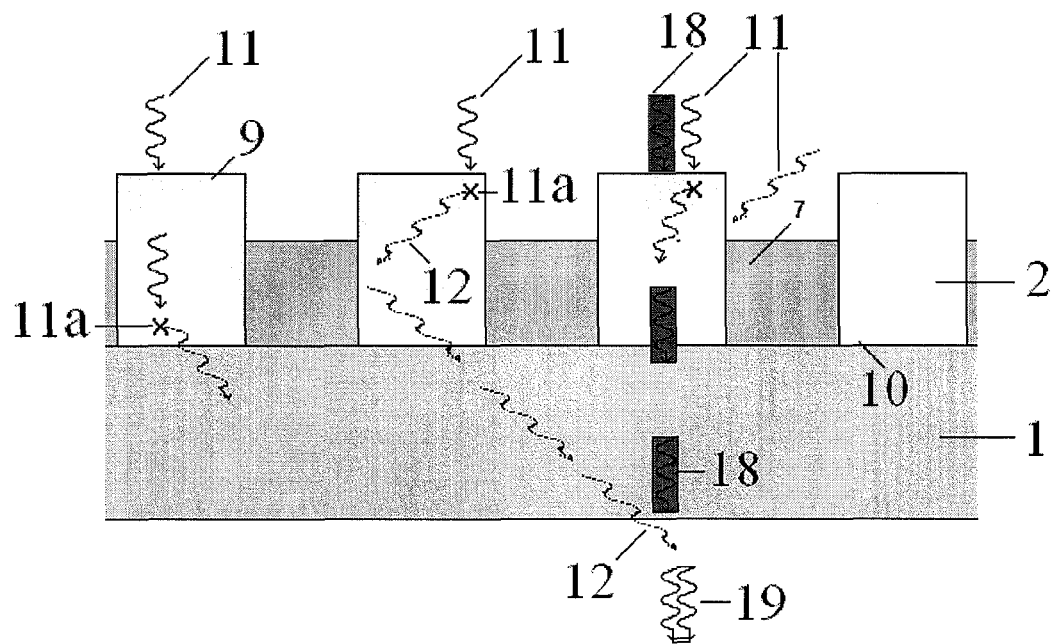
FIG. 6 shows an embodiment of a process of penetration of falling particle flux into a columnar structure material.

FIG. 6—Schematically represented process of penetration of falling particle (e.g., photon) flux into columnar structure material, propagation and reflection of emission generated thereby. 1—transparent substrate, 2—columns of material converting energy of particles entering thereinto into electromagnetic emission quanta, 7—material impermeable to particles propagating in column material, 9—outer column butt-end, 10—inner column butt-end facing substrate, 11—flux of particles falling onto columnar structure, 11a—emission generation in column material by falling particle flux, 12—propagation of emission generated in column material, 18—flux of particles falling onto column material, penetrating it, propagating across its body, passing through substrate transparent thereto, and leaving it, 19—integrated (total) emission obtained due to overlapping of certain proportion of flux of particles falling on columnar structure and certain proportion of flux of particles generated in column material by emission exciting particles constituting certain proportion in falling particle flux.

FIG. 7a-d—Schematic representation of columnar structure production technology. 1—transparent conducting substrate, 20—transparent substrate irregularities, 21—high-melting material particles, 22a—catalyst material deposited on substrate, 22b—sphere formed from catalyst material on being heated up.

Figure 8:
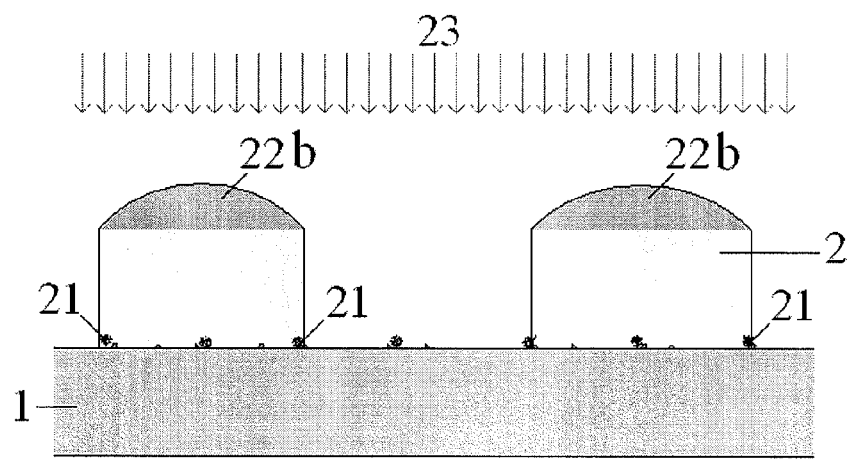
FIG. 8 shows an embodiment of a method of producing a columnar structure using a gaseous phase.

FIG. 8—Schematically represented process of columnar structure material deposition from gaseous phase. 1—transparent substrate, 2—columns of material converting energy of particles entering thereinto into electromagnetic emission quanta, 21—high-melting material particles, 22b—sphere formed from catalyst material on being heated up, 23—columnar structure material deposited from gaseous phase.

Figure 9:
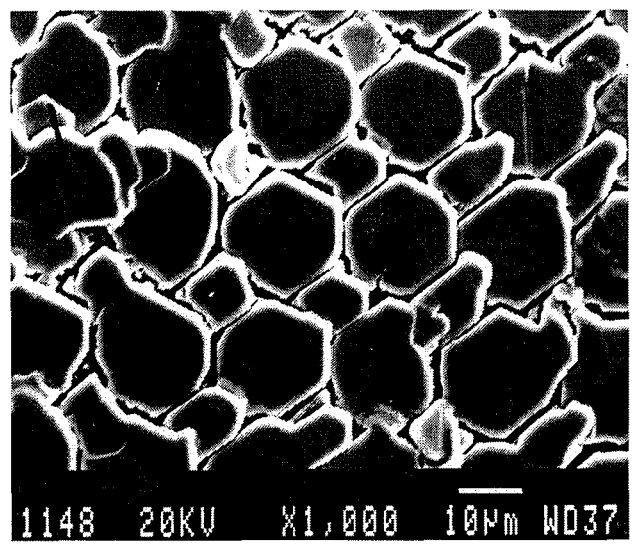
FIG. 9 shows a columnar structure morphology microphotograph of the prior art.

FIG. 9—Antecedent state of the art. Regular columnar structure morphology microphotograph taken as per RF Patent No. 2127465 ("the '465 patent"), entitled, "Method for Fabrication of Columnar-Structure Luminescence Screens," dated Mar. 10, 1999.

Figure 10:
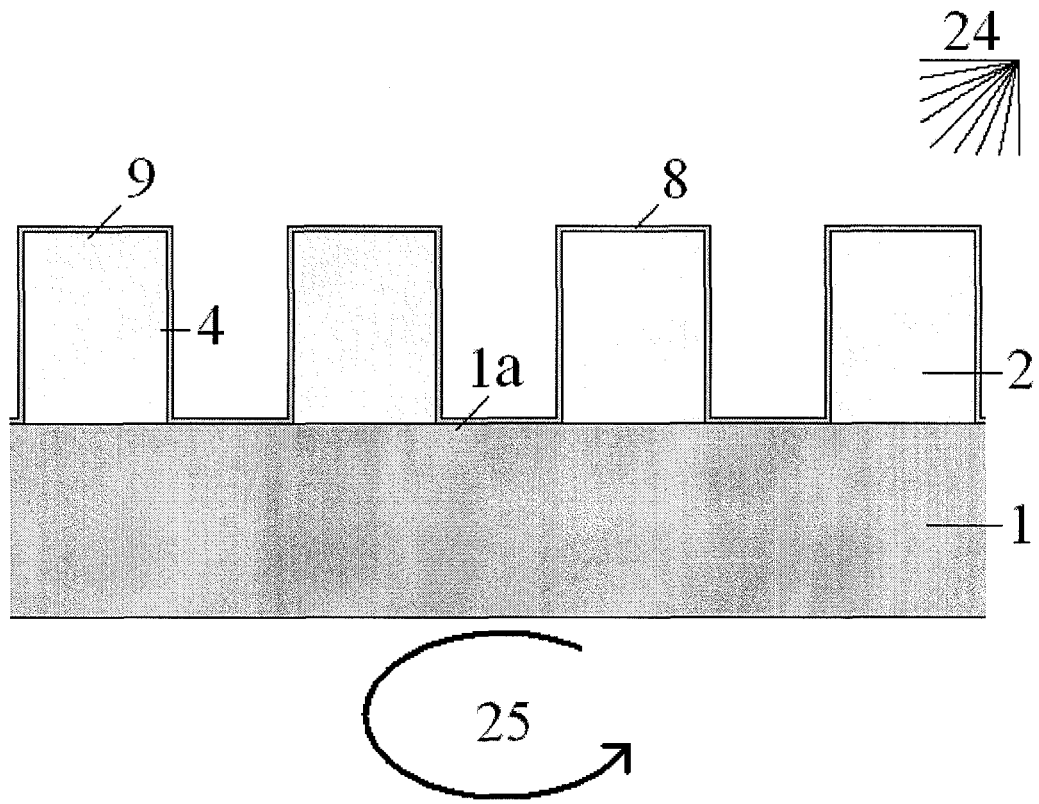
FIG. 10 shows an embodiment of a process of columnar structure column surface coating material application.

FIG. 10—Schematically represented process of columnar structure column surface coating material application. 1—transparent substrate, 1a—inside of transparent substrate, 2—columns of material converting energy of particles entering thereinto into electromagnetic emission quanta, 4—column lateral surface, 8—column surface coating opaque to quanta generated in column material, 9—column outer butt-end, 24—source of deposited material, 25—rotation of substrate with structure.

Figure 11:
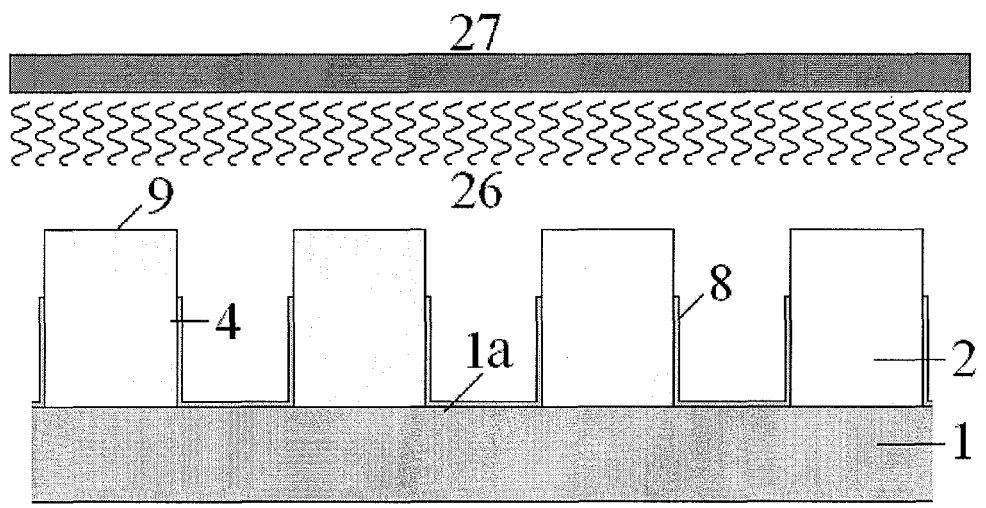
FIG. 11 shows an embodiment of a process of evaporation of material opaque to quanta generated in column material from column outer butt-end and part of column lateral surface.

FIG. 11—Schematically represented process of evaporation of material opaque to quanta generated in column material from column outer butt-end and part of column lateral surface. 1—transparent substrate, 1a—inside of transparent substrate, 2—columns of material converting energy of particles entering thereinto into electromagnetic emission quanta, 4—column lateral surface, 8—column surface coating opaque to quanta generated in column material, 9—column outer butt-end, 26—heat radiation quanta heating up coating material applied onto columnar structure surface, 27—radiator for heat radiation quanta generation.

EXAMPLES

In accordance with the present invention, the emitting elements of the device are built on a light-guiding substrate (e.g., from glass, quartz, silicon carbide or other transparent materials) as a light-guiding structure of columns with clearances provided in between. To ensure more effective emission passage through the column material, columns shall be preferably single-crystalline. The particle flux (FIG. 2a) falling at angle α to arrive at the section between the phosphor columns 6 can take part in the emission generation process 5a in the phosphor material itself 2. While propagating in the phosphor body, emission generated thereby 5a bounces as 5c from the material 8 that coats the column surface 4. Next, propagating in the phosphor material according to the total internal reflection laws, emission reaches the light-transparent substrate 1.

Figure 2B:
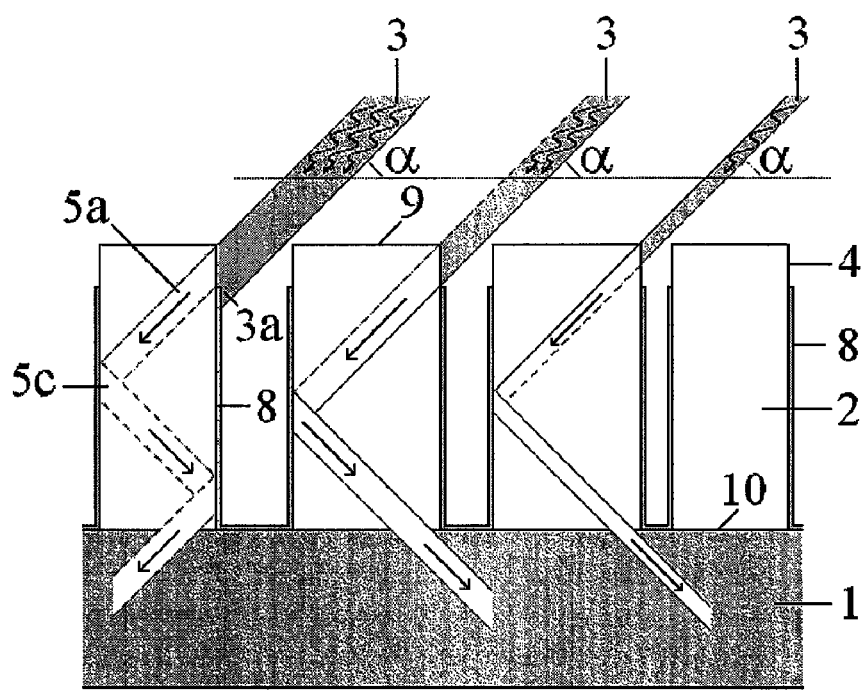

If the coating 8 is opaque to the flux of particles 3 generating emission in the phosphor material, the present invention proposes a design embodiment schematically represented in FIG. 2b. Herein a part of the coating 8 is removed from the outer butt-end 9 of the column and a part of the lateral surface 4. Arriving at the lateral surface 4, the particle flux 3 penetrates the phosphor material 2, generating emission 5a. A part of the particle flux 3 that arrives at the section of the surface 4 coated with the material 8 (selected as such a material can be any conducting material, e.g., Al) does not participate in the emission generation process.

The present invention also proposes to use the advantages of the columnar structure as a light guide in arranging the activator material within the phosphor. By distributing the activator density in such a way as to make it higher in the part closer to the outer butt-end 9 of the column and lower or even virtually zero in the part closer to the inner butt-end 10 of the column, it is possible to resolve two problems simultaneously: creating a phosphor for emission quanta generation and ensuring emission quanta propagation through a small solid angle. That is the density may feature specified distribution along the column axis. This is particularly important for collimated gun light beam production (search-lights). Upon emission generation at the phosphor section with the high activator concentration (in the part of the column closer to its outer butt-end), the photon flux, propagating along the column from its outer butt-end to its inner butt-end and to the substrate, shall not undergo absorption and scattering caused by admixtures, specifically, activator particles. Thus, the activator-free phosphor section of the column can be much longer than its activator-containing part. In accordance with the present invention (see photographs in FIG. 3a and FIG. 3b), the columnar structure can be utilized as a light-guiding structure for narrow (small solid angle) light beam production.

The present invention proposes a design easily adaptable to meet different customer conditions. Such conditions may include the selection of a particular type of emission exciting particles with consideration for their energy to suit a specific case and a particular material (specifically, a phosphor) to be used for columnar structure fabrication. In one case the energy and nature of emission exciting particles involved make it possible to restrict oneself to small-area surfaces for column material penetration. In such a case one may rather need the capacity of the columnar structure to enable emission passage along the column axis without the loss of energy (the above-mentioned light-guiding capacity of the columnar structure: the total internal reflection of propagated emission). To realize a design meant for this particular case, it is advisable to utilize a design embodiment presented in FIG. 4a, 4d, 4g. Herein the relation between height $\delta_1$ of the free section of the lateral surface 4 and height $\delta_2$ of the reflecting lateral surface (owing to the partial filling of the intercolumnar clearances with the material 7 or to the coat 8 deposited on the lateral surface of the columns) shall be for the latter, i.e. the condition $\delta_1 < \delta_2$ is met.

In another case, when the energy of emission exciting particles is not high enough and it is essential to first of all ensure the generation of as many emission quanta in the column material as possible, while obtaining appropriate image contrast on the outside of the transparent substrate, the relation between the above-stated heights may acquire another form: $\delta_1 > \delta_2$. Such a design embodiment is presented in FIG. 4c, 4f, 4i. If no special customer conditions as specified above are indicated, an intermediate design embodiment (4b, 4e, 4h) may be selected, with the condition $\delta_1 \approx \delta_2$ holding good.

Thus the desired result is achieved owing to the use of a part of the lateral surfaces of the columnar structures in the process of particle absorption and subsequent emission generation with the columnar structures retaining their capacity to efficiently transmit such emission during its propagation therein through total internal reflection. The "vertical" component of the section of the columnar structure material (specifically, a phosphor) that is represented by a part of the lateral surface of the column makes it possible to increase the number of emitted energy quanta produced per unit emitting surface area.

As a typical example of the present invention embodiment, let us consider a column structure design for cathodoluminescence realization. Arranged on a glass (or, e.g., quartz, silicon nitride, sapphire, etc.) substrate 1 (FIG. 5a) some distance apart (with the clearance 6) are columns comprising a columnar structure of the cathodoluminescence screen. One butt-end (inner) 10 of each column is attached to the said glass light-guiding substrate 1. The other butt-end (outer) 9 of each column is free and faces an electron source—a cathode. In this case the screen structure itself is an anode. If ZnO:Zn is a columnar structure material 2 then a metal film of Zn (or Al) can be used as the coating 8 on the lateral surface 4 and the outer butt-end 9, transparent to the flux of electrons 11 (as generation exciting particles). It will additionally serve as an activator, along with Zn particles, located in the ZnO material body. This same layer also helps remove the electric charge accumulated during column phosphor material bombardment. The reflecting metal film deposited on the lateral surface 8 of the column and its outer butt-end 9 ensures total reflection of all the electromagnetic emission generated in the phosphor material—photons that can leave the said material only through the inner butt-end 10 facing the substrate and further on through the substrate.

Electrons 11 falling onto the columnar structure at angles and arriving at the intercolumnar clearance have different perspectives. Part of them 13 arriving at the lateral surface of the Zn-coated at a sufficiently large angle have chances of passing through the above metal layer into the phosphor material and generating 11a an emission quantum with the propagation direction 12. The other part 14 with small angles to the lateral surface of the columns cannot penetrate the Zn metal barrier, flying for quite a long time along such surface and interacting therewith.

Figure 5B:
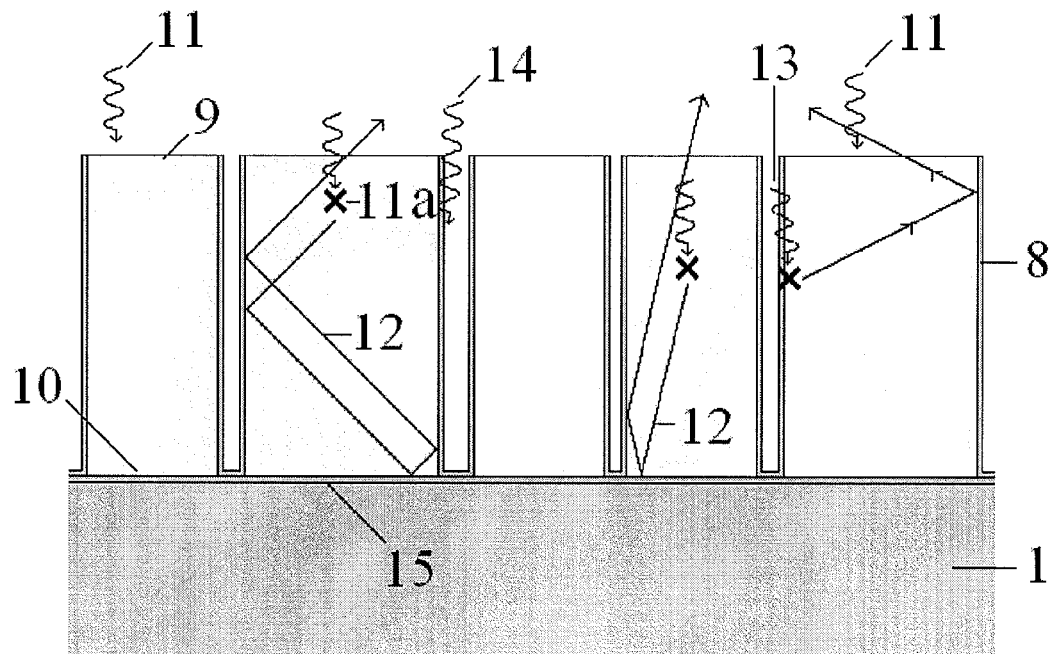
Figure 5C:
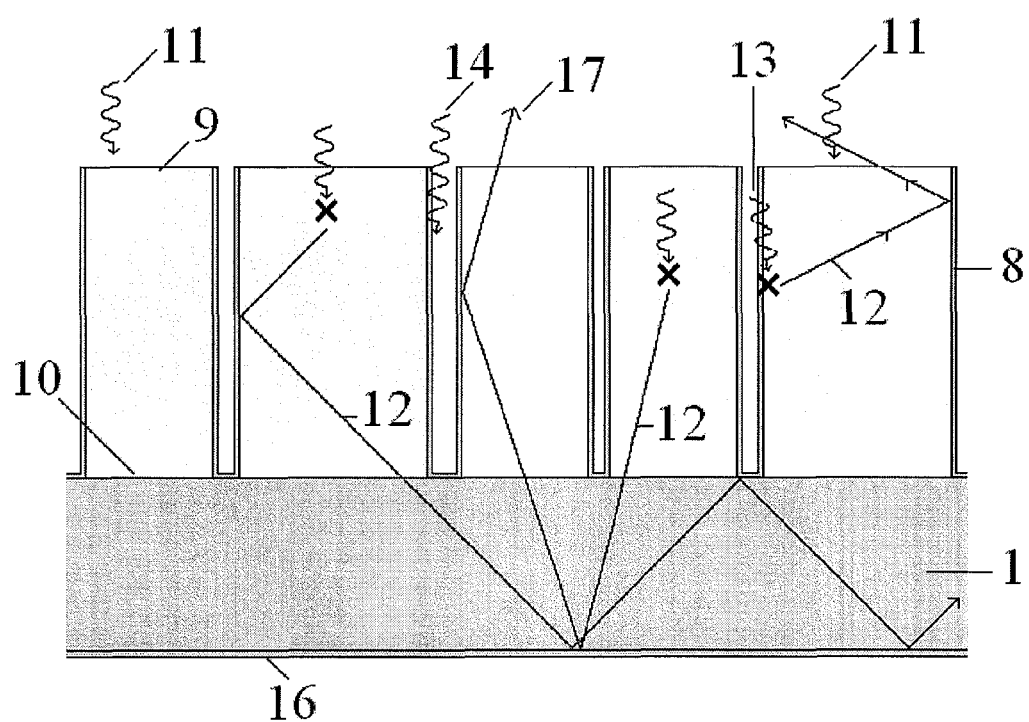

The present embodiment of the proposed design can be transformed from the transmission-mode cathodoluminescence screen into the reflection-mode cathodoluminescence screen. In this case (FIG. 5b) there is no reflecting coating deposited on the surface of the outer butt-end 9, whereas on the inside of the glass substrate 15 such coating is provided. Alternatively, instead of the inside of the substrate 15, the coating is deposited on the outside of the substrate 16 (FIG. 5c). In such cases photons generated in the phosphor material bounce from all reflecting surfaces of the column and leave it 17 through its outer butt-end 9. Thus they exit from the same butt-end through which electrons enter the phosphor material.

As another example of the present invention embodiment let us consider a columnar structure meant for light source realization. Just like in the previous example, arranged on a glass substrate 1 (FIG. 6) some distance apart are columns 2 comprising a columnar structure of the light source. One butt-end (inner) 10 of each column is attached to the said glass light-guiding substrate 1. The other butt-end (outer) 9 of each the column is free and faces a photon source—a diode, or some other electromagnetic emission source. As a diode, one can use, for instance, a device based on GaNInN compounds. With a garnet (Stokes) phosphor, as, for instance, $Y_3Al_5O_{12}$: Ce or CdSZnS:Ag, a metal film of Al (Pt, Ag or other), with the surface prepared by Cr deposition, can be used as the columnar structure material 2, deposited as the coating 8 on the lateral surface 4. As the diode-generated photon flux 11 with the UV-to-blue emission spectrum enters the phosphor material, it undergoes transformation. UV emission photons 11 generate 11a in the said phosphor material emission quanta (having the propagation direction 12) corresponding to yellow light. The superposition of this emission and the blue-color quanta 18 yields an integral (combined) result—the white color 19. The reflecting material in this design is deposited only on a part of the lateral surface of the column which ensures the efficient use of the column surface (including a part of the lateral surface) for penetration of emission exciting particles (generating electromagnetic emission quanta inside the phosphor column) and channeling of the electromagnetic emission generated in the phosphor material, i.e. photons along the column, like a light guide. Such an emission leaves the said material through the inner butt-end 10 facing the substrate and further on through the substrate. Part of the emission can also exit through the outer butt-end 9 of the column. There is no reflecting coating provided on this butt-end and the same is true for a part of the lateral surface close to the outer butt-end 9 of the column. This is due to the fact that photons required for generation and summation of resultant emission leaving the phosphor column shall penetrate the phosphor material through the outer butt-end 9 of the column and through a part of the lateral surface.

Figure 7A:
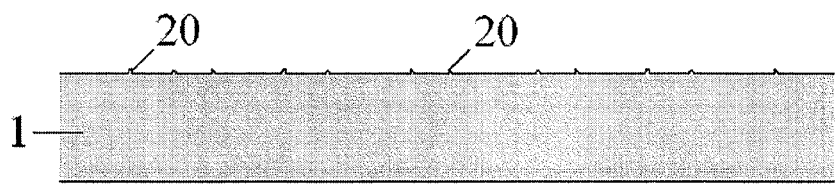
FIGS. 7a-d represent one embodiment of a method of producing a columnar structure described herein.
Figure 7B:
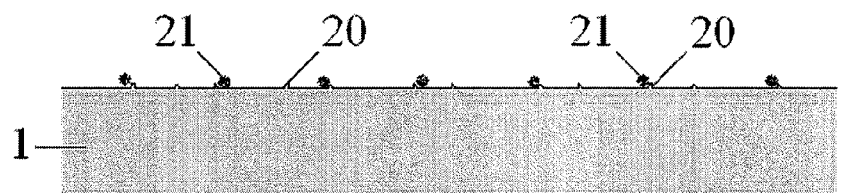
Figure 7C:
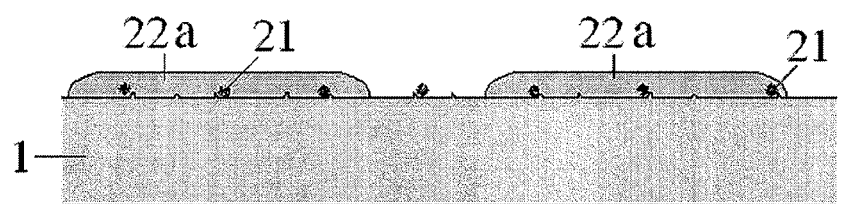
Figure 7D:
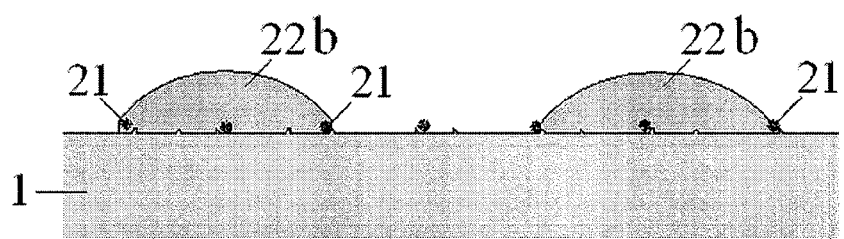

As an example of the method for columnar structure fabrication as per the present invention let us consider the following case. Deposited on the substrate surface is a substance, e.g., Cr that combines with the substrate material. As a result, islands 20 (FIG. 7a) are formed on the substrate surface that rupture chemical bonds on the said surface creating surface irregularities at that. This is especially important for such materials as glass. By virtue of such islands 20 a high-melting material 21 subsequently deposited in small proportion can get keyed well to the smooth surface (FIG. 7b). Used as such a material can be any high-melting substance, e.g., Pt. Upon deposition of a catalyst material 22a (FIG. 7c) (by lithographic printing or mask evaporation), e.g., Cu (or Ag, Au, Al, etc.) and subsequent heating, an effect is achieved that is essential for the creation of a columnar structure with preassigned specific distribution over the substrate surface. Basically, the effect consists in that a drop of the catalyst metal should acquire a near-sphere form 22b (FIG. 7d) with practically no displacement from the specified position. This is attained owing to the capacity of the higher melting point material Pt to retain its state and position unchanged 21 (FIG. 7d) at temperatures when a lower melting point material melts, forming a drop. Because of that, the capacity of the drop to move over the smooth surface declines, i.e. it gets "secured" in the specified point of the surface and acquires a spherical form without breaking down into fragments. Following that the deposition of the substance material 23 (FIG. 8) of the future column 2 from the gaseous phase takes place, the said column acquiring a single-crystalline structure by the vapor-liquid-solid (VLS) mechanism. The structure produced by the described method takes more perfect forms than those obtained as per the '465 patent. The said effect can be seen when comparing the structure produced using the above-described method and presented in the photograph FIG. 3b against the structure obtained as per the '465 patent and presented in the photograph FIG. 9. As can be seen from the photographs, the structure presented in FIG. 9 is of ordered character, i.e. it was produced using one of the drop positioning methods. However the method for creating such a structure is imperfect which resulted in the presence of columns differing in form and size (conditional diameter). The method proposed by the present invention makes it possible to form essentially identical emitting elements of the columnar structure and position them strictly in the specified points of the substrate surface (FIG. 3b).

When creating the columnar structure as per the present invention, a catalyst metal may be selected in such a way as to make it act as an emission generation activator for the future phosphor (if the gaseous phase contains a small amount of the activator or not at all). Not only one material can be used as a catalyst metal, i.e. also an alloy of different metals and other chemical elements may well be an option. In the course of growth it will be "captured" by the forming column structure. In the process, depending on the selected growth mode, the amount of the "captured" activator-catalyst material may vary. If as a catalyst material for VLS growth is used a substance that is not to act as an activator for the material of the column 2 (FIG. 8) thus obtained, then upon formation of column 2 the said material is removed by any of the known available methods (for instance, by etching or evaporation). In such a case, the activator material can be introduced either by ion implantation, or by the deposition of the activator material on the column surface and its subsequent annealing for intrusion into the column surface, or by any other known available method. The needed activator can also be introduced into the catalyst material at a certain stage of the column formation. This is especially important when light sources with narrow emitted radiation beams are created, as described above.

Next, in order to realize one of the columnar structure creation options, the material is deposited from the source 24 on the outer butt-ends 9, lateral surfaces of the columns and onto the part 1a of the substrate surface (FIG. 10) with the substrate simultaneously rotated 25 around an axis perpendicular to the substrate surface. The structure thus produced is suitable for emission generation in the column material owing to the penetration of particles to which the deposited layer 8 is transparent. For instance, for the case of using the columnar structure as a cathodoluminescence screen: electrons are capable of penetrating a thin metal coat. If emission is generated in the column material (phosphor) by using electromagnetic emission (e.g., UV-spectrum) quanta, the column surfaces 9 and 4 coated with a thin metal film layer 8 will not be transparent. In order to make a part of the column surfaces transparent to the said generation exciters, a part of the thin layer is removed. This can be done, for example, by heating with the quanta flux 26 issued by a thermal radiator 27 (FIG. 11).

To fill the intercolumnar clearance and produce structures presented in FIG. 4 (a-c), use can be made of galvanization techniques with the prior placement of conducting material on the parts 1a of the substrate. The same result can be obtained by depositing an ample amount of metal on the entire columnar structure, then melting it with help of the heat radiator presented in FIG. 11, and removing the metal remaining on the outer butt-end 9 of the column and the part of its lateral surface. If it is necessary to produce a thin metal film in addition to the metal-filled clearance, repeated deposition can be performed following all these operations by using a method presented in FIG. 10. And then a part of it can be removed by evaporation (such a structure is presented, for instance, in FIG. 4g, 4h, 4i).

Figure 12:
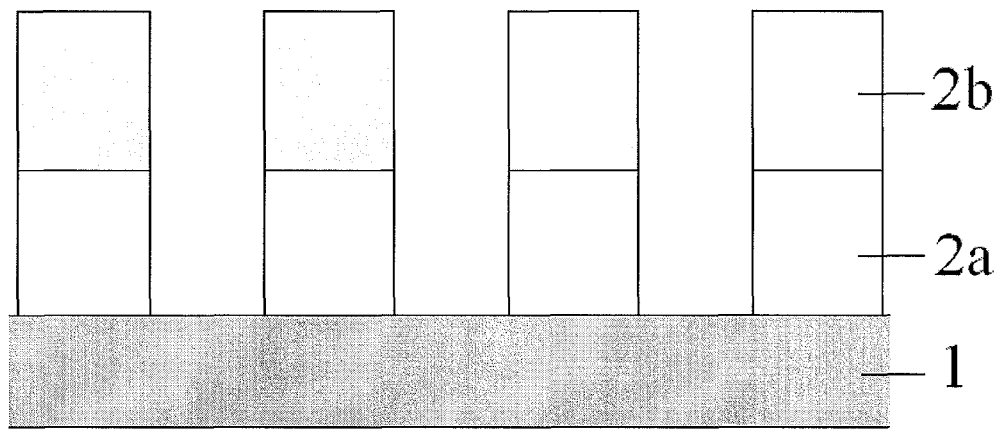
FIG. 12 shows a cross-section of an embodiment of a columnar structure comprising columns with varying compositions of phosphors.

To realize an X-ray electronic-optical transducer, CsI shall be used as the columnar material. Herein, to use the total of the generated emission more efficiently, it is advisable to utilize a transparent substrate 1 having a columnar structure comprising columns with the different composition of phosphors 2a and 2b and appropriate activators distributed along their axes (FIG. 12). Such a structure can be also efficient when realized in cathode-, electron, and photoluminescence screens.

The present invention can also be used for fabrication of an optical dosimeter containing heavy elements or organic compounds (e.g., biocrystals) as a γ-particle absorbing material.

All patents and references incorporated by reference herein are incorporated by reference herein only with respect to the particular embodiments, materials, processes of manufacture and methods of use described therein. These patent are not to be considered incorporated by reference to the extent any of these patents expresses an opinion or presents any representation, characterization, or definition (either expressly or by implication) that is inconsistent with the opinions, representations, characterizations or definitions expressly made herein.

While there have been described herein what are to be considered exemplary embodiments of the present invention, other modifications of the invention will become apparent to those skilled in the art from the teachings herein. It is therefore desired to be secured in the appended claims all such modifications as fall within the true spirit and scope of the invention. Accordingly, what is desired to be secured by Letters Patent is the invention as defined and differentiated in the following claims.

What is claimed is:

1. A columnar structure located on a transparent substrate having an inside and an outside, comprising:
    at least one emitting element, a light-guiding element, a dielectric element, and a conducting element;
    wherein the at least one emitting element of the columnar structure is a column that conducts and/or emits a particle flux;
    wherein a butt-end surface of the columnar structure faces the inside of the substrate and contacts it either immediately or indirectly;
    wherein the other butt-end of the columnar structure allows passage of emission exciting particles inside the column;
    wherein a portion of the lateral surface of the columnar structure is coated with a material that reflects the flux of particles propagating within the columnar structure; and
    wherein particle penetration also takes place through a part of the lateral surface of the column.

2. The columnar structure of claim 1, wherein the column comprises a single-crystalline structure.

3. The columnar structure of claim 1, wherein the butt-end surface of the column is coated with a light-reflecting conducting material.

4. The columnar structure of claim 1, wherein the inside and outside of the substrate are coated with a light-reflecting conducting material.

5. The columnar structure of claim 1, wherein the columnar structure comprises a phosphor and at least one activator, the density of the at least one activator featuring a specified distribution along the column axis.

6. The columnar structure of claim 5, wherein the columnar structure comprises at least a second phosphor of some other composition.

7. The columnar structure of claim 1, wherein the column is completely coated with a material reflecting the flux of particles propagating in the column material.

8. The columnar structure of claim 1, wherein the material covering a part of the lateral surface and reflecting the flux of particles propagating in the column material comprises a material used for filling a part of the intercolumnar space.

9. The columnar structure of claim 8, wherein the remainder of the lateral surface of the column and the butt-end of the column through which the flux of emission exciting particles penetrates thereinto are coated with a thin film of a light-reflecting material.

10. The columnar structure of claim 1, wherein the columnar structure comprises an inorganic compound.

11. The columnar structure of claim 1, wherein the columnar structure comprises an organic compound.

12. A light source comprising:
a source of particles capable of generating electromagnetic radiation quanta in the solid; and
a material in which electromagnetic radiation quanta are generated;
wherein the material features a columnar structure according to claim 1.

13. An X-ray electronic-optical transducer containing
a material in which electromagnetic radiation quanta are generated during X-ray absorption, wherein the material features a columnar structure according to claim 1.

14. An optical dosimeter containing
a material in which electromagnetic radiation quanta are generated during radiation absorption, wherein the material features a columnar structure according to claim 1.

* * * * *